Patented Dec. 14, 1937

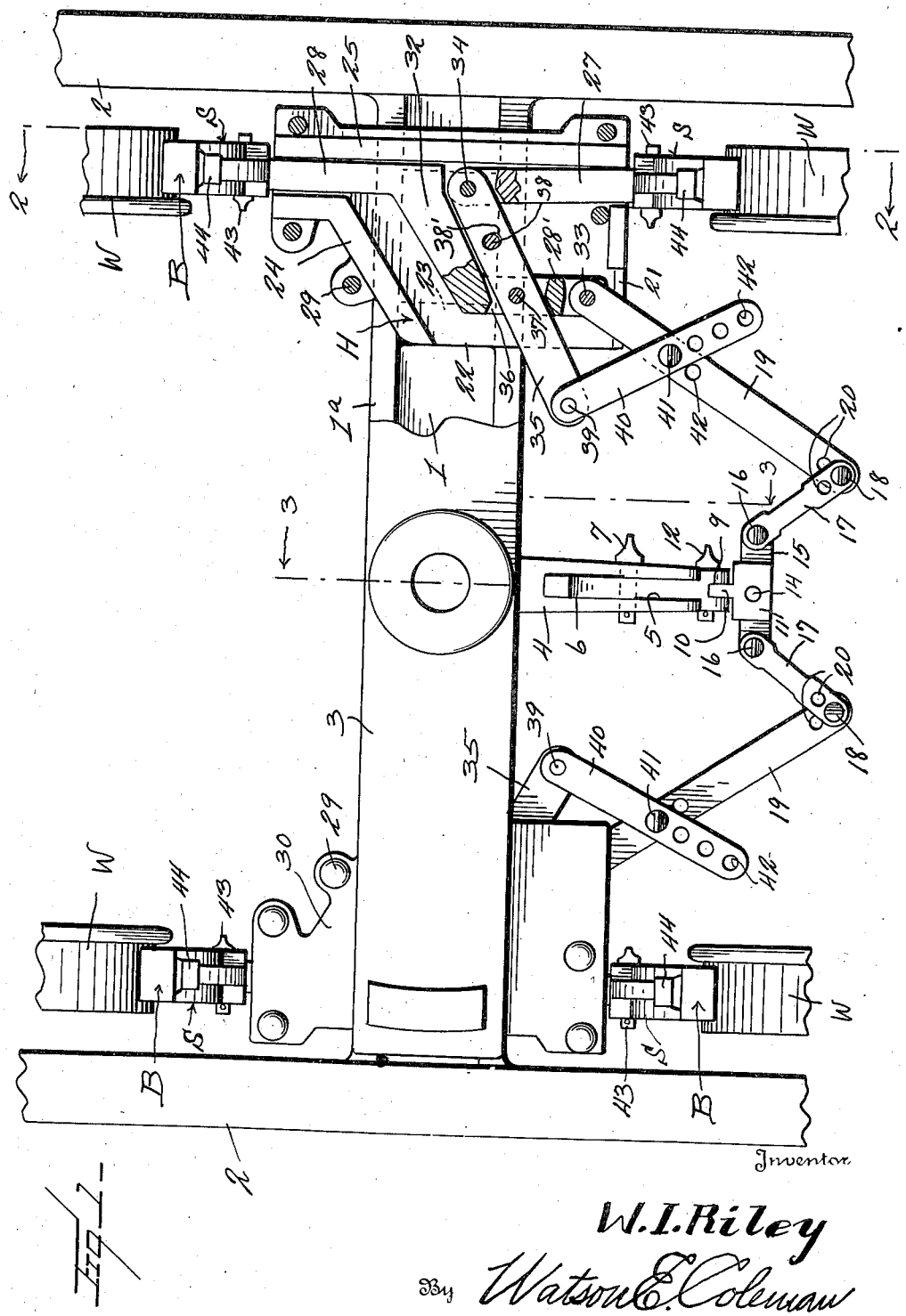

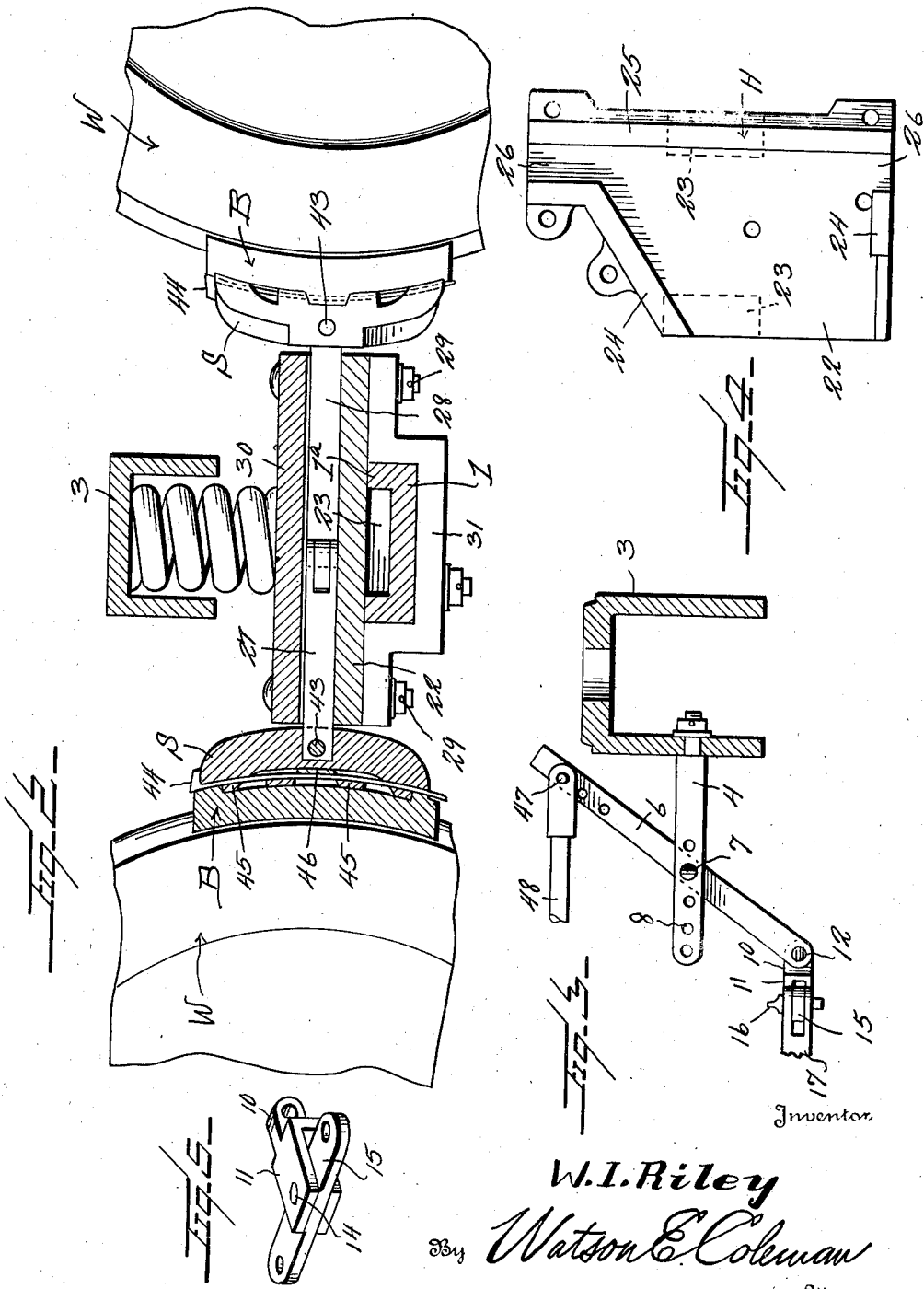

2,102,222

UNITED STATES PATENT OFFICE 2,102,222

BRAKE ACTUATING MECHANISM

William I. Riley, Trussville, Ala.

Application March 16, 1937, Serial No. 131,221

3 Claims. (Cl. 188—53)

This invention relates to a brake actuating mechanism, and it is primarily an object of the invention to provide a mechanism of this kind which dispenses with the use of the customary brake beam, safety hangers for the brake beam, dead lever, and dead lever guides.

It is also an object of the invention to provide a mechanism of this kind which is constructed and assembled in a manner whereby is substantially eliminated the liability of any part of the mechanism dropping down on the trackway with resultant disastrous effects, as for example wrecking of the train.

Another object of the invention is to provide a brake operating mechanism which may be readily applied to the spring plank or kindred part of a car structure and wherein the mechanism is of a type that can be operated with equal facility by hand or as a part of an air brake system.

The invention consists in the details of construction and in the combination and arrangement of the several parts of my improved brake actuating mechanism whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a fragmentary view in top plan with portions broken away of a brake operating mechanism constructed in accordance with an embodiment of my invention and in applied or working position;

Figure 2 is a fragmentary sectional view taken substantially on the line 2—2 of Figure 1 with certain of the parts in elevation;

Figure 3 is a detailed fragmentary sectional view taken substantially on the line 3—3 of Figure 1 with certain of the parts in elevation;

Figure 4 is a view in plan of a casting or housing section as herein embodied unapplied;

Figure 5 is a view in perspective showing the mounting of the central equalizing lever as herein embodied.

As disclosed in the accompanying drawings, 1 denotes a conventional type of spring plank interposed in a conventional manner between the side frames 2 of the truck and which is positioned, as is well known, below the bolster 3. The plank 1 and bolster 3 as is well known, are interposed between the wheels W comprised in a truck structure. As the details of the truck structure form no particular part of the present invention a description and illustration thereof is believed to be unnecessary other than to state that the bolster 3 at its longitudinal center is provided with an outstanding fulcrum bar 4. This bar 4, as herein disclosed, has its outer end portion formed to provide a kerf 5 through which passes a vertically disposed main or operating lever 6. This lever 6 is pivotally supported at a desired point intermediate its ends by a pin 7 selectively disposed through the openings 8 spaced lengthwise of the bar 4. By these openings 8 the position of the lever 6 upon the bar 4 may be adjusted as preferred or required.

The lower portion of the lever 6 is forked, as at 9, and received within said fork is a lug 10 extending rearwardly from a clevis 11. This lug 10 is pivotally held to the lower end portion of the lever 6 by the pin 12 or the like whereby the clevis 11 is capable of swinging movement in an up and down direction or in a direction lengthwise of the lever 6. Received within the clevis 11 and pivotally held thereby, as at 14, is an equalizing lever 15 of a length to extend a relatively short distance beyond each side of the clevis 11.

Each end portion of the lever 15 is pivotally connected by a pin 16 with an end portion of a short link 17. These links 17 are of duplicate construction and diverge from the lever 15 and the outer end portion of each of said links 17 is pivotally connected by the pin 18 with the outer end portion of a secondary lever 19. The adjacent extremities of the link 17 and lever 19 are provided lengthwise thereof with the spaced openings 20 through which the pin 18 is selectively directed to effect such relative adjustment of the link 17 and lever 19 as may be desired.

Each of the secondary levers 19 is disposed inwardly and outwardly toward the plank 1 and enters through a suitably positioned opening 21 a housing H held to the plank 1. As herein disclosed this housing H comprises a casting or plate 22 of desired dimensions and configuration and which is provided on one face with a pair of spaced lugs 23 which snugly engage between the side flanges 1ª of the plank 1 thus assuring the plate 22 being effectively maintained in applied position upon the plank 1 and also permitting a reverse application of the plate 22 upon the plank 1 if so desired.

The plate 22 has extending from its side face opposite the lugs 23 the end flanges 24 and one side flange 25. The flanges 24 terminate a slight distance from the side flange 25 to provide openings 26 through which operate the plungers or pitmans 27 and 28. Bolted or otherwise held, as at 29, to the flanges 24 and 25 of the plate 22 is a closure plate 30. The plate 22, as herein disclosed, is held in desired position upon the plank 1 by a clamping bracket 31 as particularly illustrated in Figure 2 although it is to be understood that this plate 22 may be securely held to the plank 1 in any manner desired.

The inner end portion of the plunger or pitman 28 or that extremity within the housing H is provided with a laterally extending arm 32, the outer end portion of which is continued by the supplemental plunger or pitman 28' substantially in parallelism with the main plunger or pitman 28.

The end portion of the secondary lever 19 remote from its associated link 17 is pivotally connected, as at 33, with the outer or free end portion of the supplemental plunger or pitman 28' for a purpose to be hereinafter more particularly mentioned. The plunger or pitman 27 is substantially in line with the main pitman or plunger 28 and the inner or inserted end portion of this plunger or pitman 27 is pivotally connected, as at 34, with an end portion of a lever 35. This lever is of desired length and is directed through an opening 36 provided in the supplemental plunger or pitman 28' and extends outwardly of the casting H through its open side. This lever 35 is also pivotally connected, as at 37, with the supplemental plunger or pitman 28'. At a point midway of its pivotal connections 34 and 37 the lever 35 is held to the housing H by the pin 38 upon which the lever 35 rocks. The opening 38' in the lever 35 through which the pin 38 is disposed, is slightly elongated to compensate for any slight inequalities of movements of the plungers or pitmans 27 and 28 upon swinging of the lever 35.

The outer end portion of the lever 35 has pivotally connected thereto, as at 39, an end portion of a link 40 of a length to extend across the adjacent secondary lever 19 and pivotally connected thereto by a pin 41. This pin 41 is selectively disposed through registering openings 42 in the lever 19 and link 40 spaced lengthwise thereof whereby such adjustment or variation of the pivotal mounting 41 may be readily obtained as found necessary.

The outer end portion of each of the plungers or pitmans 27 and 28 is held, as by a pin 43, to a brake shoe S herein disclosed as being provided with a removable wear block B held to the shoe S by a key 44 threading through suitably positioned loops 45 carried by the shoe S and 46 carried by the opposed face of the wear block B. The end portion of the lever 6 above or remote from the clevis 11 has adjustably connected therewith, as at 47, a brake rod 48 or the like which may be actuated from a hand wheel or in any well known manner in an air brake system.

Upon swinging movement of the lever 6 in one direction pull will be imposed upon the secondary levers 19 resulting in swinging movement of the levers 35 causing the plungers or pitmans 27 and 28 to move outwardly in unison to bring the blocks B of the shoes S into desired braking contact with the treads of the wheels W and, of course, the release of the brakes will occur upon reverse operation.

It is believed to be obvious that with a mechanism as herein described and illustrated an effective braking action is accomplished with the further advantage of eliminating the use of a brake beam, hangers, and other brake accessories now generally in use which ofttimes drop while a train is in motion resulting in a wreck or other damage and delay. It is to be noted that my improved mechanism is one wherein no matter what connection may become broken there will be nothing to drop or will in any way cause damage thereby materially increasing safety in travel with a substantial elimination of losses resulting from accidents.

It is also to be noted that the mounting of the various parts of the mechanism is such as to readily compensate or equalize for any slight inequalities which may occur in the application of the brakes thereby further materially increasing the value of the mechanism.

From the foregoing description it is thought to be obvious that a brake actuating mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with a transverse member of a wheel truck, plungers supported by said transverse member for sliding movement beyond opposite sides of the member, one of the plungers having its inner portion laterally offset, a lever pivotally connected with the inner end portion of the second plunger and with the offset part, means for pivotally holding said lever to the transverse member at a point between its pivotal connection with the plungers, a secondary lever pivotally connected to the offset portion of one of the levers, a link pivotally connecting the first named lever and the secondary lever, means for swinging the secondary lever to move the plungers outwardly or inwardly in unison, and brake shoes carried by the outer extremities of the plungers.

2. In combination with a transverse member of a wheel truck, plungers supported by said transverse member for sliding movement beyond opposite sides of the member, one of the plungers having its inner portion laterally offset, a lever pivotally connected with the inner end portion of the second plunger and with the offset part, means for pivotally holding said lever to the transverse member at a point between its pivotal connection with the plungers, a secondary lever pivotally connected to the offset portion of one of the levers, a link pivotally connecting the first named lever and the secondary lever, an operating lever mounted for swinging movement, an equalizing bar in pivotal connection with the operating lever, and a link pivotally connecting the equalizing bar and the secondary lever.

3. In combination with a transverse member of a wheel truck, plungers supported by said transverse member for sliding movement beyond opposite sides of the member, one of the plungers having its inner portion laterally offset, a lever pivotally connected with the inner end portion of the second plunger and with the offset part, means for pivotally holding said lever to the transverse member at a point between its pivotal connection with the plungers, a secondary lever pivotally connected to the offset portion of one of the levers, a link pivotally connecting the first named lever and the secondary lever, an operating lever mounted for swinging movement, an equalizing bar in pivotal connection with the operating lever, and a link pivotally connecting the equalizing bar and the secondary lever, the mounting of the equalizing bar permitting swinging movement of the bar in substantially perpendicularly related directions.

WILLIAM I. RILEY.